United States Patent [19]

Barn et al.

[11] Patent Number: 5,768,279
[45] Date of Patent: Jun. 16, 1998

[54] BROAD BAND TRANSMISSION SYSTEM

[75] Inventors: Belwinder S. Barn; Joe Geofroy; Piyush Bhupatrai Kothary, all of Burnaby; Christopher Michael Look, Coquitlam, all of Canada

[73] Assignee: IBM Corporation, Charlotte, N.C.

[21] Appl. No.: 186,677

[22] Filed: Jan. 25, 1994

[51] Int. Cl.$^6$ .................................................. H04H 1/08
[52] U.S. Cl. ...................... 370/486; 370/487; 370/496; 359/125; 348/12; 455/51
[58] Field of Search .......................... 370/30, 69.1, 71, 370/73, 76, 485–487, 496; 455/5.1, 3.1, 4.1, 4.2, 6.1, 6.2; 359/124, 125, 127; 348/7, 10, 12, 13, 14; 379/93.01

[56] References Cited

U.S. PATENT DOCUMENTS

| | | | |
|---|---|---|---|
| 3,943,447 | 3/1976 | Shomo, III | 455/5.1 |
| 4,430,731 | 2/1984 | Gimple et al. | 370/487 |
| 4,450,477 | 5/1984 | Lovett | 455/5.1 |
| 4,586,078 | 4/1986 | Citta et al. | 455/5.1 |
| 4,768,188 | 8/1988 | Barnhart et al. | 370/434 |
| 5,361,091 | 11/1994 | Hoarty et al. | 455/5.1 |
| 5,421,030 | 5/1995 | Baran | 455/5.1 |
| 5,425,027 | 6/1995 | Baran | 370/480 |
| 5,450,443 | 9/1995 | Siegel et al. | 375/286 |

*Primary Examiner*—Benedict V. Safourek
*Assistant Examiner*—Seema S. Rao
*Attorney, Agent, or Firm*—Anderson, Levine & Lintel, LLP

[57] ABSTRACT

A broad band broadcasting transmission system for sending broad band downstream data and telephone signals from a central office to a number subscriber set top terminal. Each frame of data is marked to indicate the set top terminals it is to be received by. A downstream light fiber is located between the head office and a curbside box. A transmitter transmits the frames along a light fiber to a SAC box. A converter converts the light signals from the light fiber to electrical signals. A distribution line coupled to the curbside box carries the electrical signals to a plurality of drop line twisted pair conductors connected to the distribution line. The drop lines are coupled via a residential units to the set top terminals. The downstream data is transmitted in a single broad frequency band in a frequency range starting sufficiently greater than zero so that distinct frequency bands are available between zero and the starting frequency for the transmission of ordinary telephone service and upstream signals from the set top terminals to the central office.

37 Claims, 5 Drawing Sheets

FIG. 15

BROAD BAND TRANSMISSION SYSTEM

FIELD

The present invention relates to a broad band transmission system for broadcasting audio, video and data signals to a plurality of subscribers.

BACKGROUND

Conventional telephone service has been emerging as an important vehicle for the rapid expansion of telephone service to include such things as "video on demand" in which the user sends control signals through a set top terminal back up the telephone lines to a central office in order to control the nature of the service received or to control the operation of items for a particular type of service. In particular, the expanding infrastructure of fibre optic lines has permitted the transmission of not only audio and still or near still frame video but also ordinary moving pictures. However, notwithstanding the capability of light fibers to transmit information at an extremely high rate, the most cost effective system for bringing this information to individual subscribers has yet to be worked out. Obviously, it is possible to replace all of the building wiring, the wiring from a curbside box to each residence and the wiring within each residence but only at a prohibitive expense. A more practical approach would be to utilize existing wiring as much as possible, particularly that leading to the separate subscribers.

One approach to transmitting high speed information together with ordinary telephone service is to use what is known as the ADSL-1 standard. The ADSL-1 approach requires a switch at the central office which switches the signals at that location along separate lines to each subscriber. The data is transmitted at 1.544 megabits per second and is transmitted together with the ordinary telephone service. The service also provides for upstream transmission from the subscriber to the central office. A major problem with this technique resides in the cross talk between lines from the central office to the curbside box and in attenuation. Moreover, this technique requires an installation of a relatively complex switch in the central office to accomplish the switching to each subscriber. A second more advanced standard known as ADSL-3 utilizes data which is transmitted at 6 megabits per second but is otherwise similar to the ADSL-1 system. Under both systems the frequency power spectrum has the ordinary telephone service occupying the zero to $f_1$ frequency range, the upstream transmission from $f_2$ to $f_3$ and the downstream from $f_4$ to $f_5$ where $f_1$ is less than $f_2$, and $f_3$ is less than $f_4$. Under both of the latter systems separate lines for each subscriber from the central office to the curbside box are required.

Accordingly, it is an object of the invention to provide an improved broad band transmission system.

SUMMARY OF THE INVENTION

According to the invention there is provided a broad band transmission system for sending downstream broad band data and telephone signals from a central office to a number of subscriber set top terminals and to carry upstream control signals from each set top terminal to the central office. Means are provided for marking each frame of data to indicate the set top terminals it is to be received by. A downstream light fibre is installed between the head office and a box proximate a plurality of the set top terminals. Means are provided for transmitting the frames along the downstream light fibre to the box and for converting the light signals from the downstream light fibre to electrical signals. The electrical signals go to a plurality of drop lines coupled between the box and to respective ones of the plurality of set top terminals. Each drop line is made up of one or more twisted pairs of conductors. The downstream data is broadcast in a single broad frequency band in a frequency range starting above 1 megahertz so that distinct frequency bands are available between zero and the starting frequency for the transmission of ordinary telephone service and upstream signals from the set top terminals to the central office.

Preferably, the downstream signals are coded so that the power versus frequency curve is weighted towards the lower frequencies and the power drops to zero at zero frequency.

Means are also provided for transmitting data from each set top terminal to the central office so that a subscriber may control the data he receives.

An upstream light fibre is located between the curbside box and the central office for carrying data from the set top terminals to the central office.

Advantageously, the pulse code has an equal number of positive and negative going pulses.

One of the drop lines may be a twisted pair coupled to a residence coaxial cable installation.

Unlike conventional ADSL systems, the system of the present invention broadcasts the data to each subscriber set top terminal. Since each line carries the same signal, although there may be cross-talk between lines, it is not a problem as it is in conventional ADSL systems. Conventional ADSL operates only below 1 MHz whereas the present invention operates above 1 MHz and over a much wider frequency band, thereby allowing much larger data rates.

BRIEF DESCRIPTION OF THE DRAWINGS

The novel features believed characteristic of the invention are set forth in the appended claims. The invention itself, as well as other features and advantages thereof, will be best understood by reference to the description which follows read in conjunction with the accompanying drawings, wherein:

DETAILED DESCRIPTION WITH REFERENCE TO THE DRAWINGS

Figure 1:
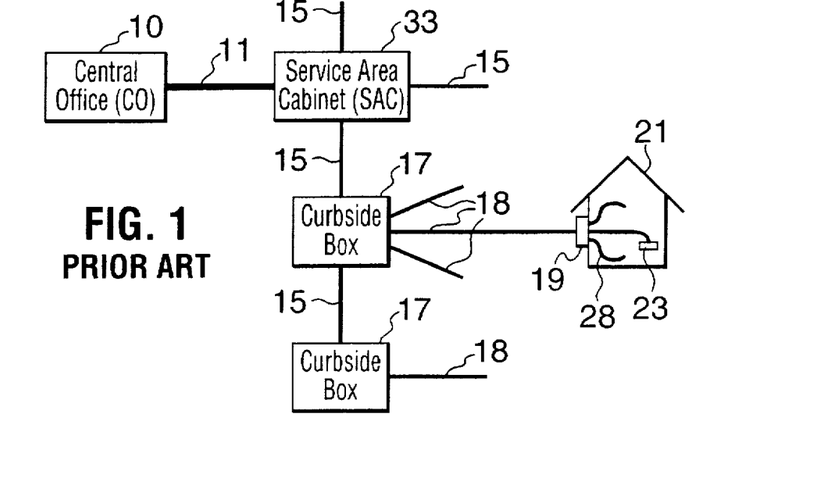
FIG. 1 is a schematic diagram of a conventional telephone signal distribution system.

Referring to FIG. 1 there is shown a schematic diagram of a conventional ADSL system for transmitting broad band information. A central office 10 is coupled by a feeder cable 11 having typically about 600 twisted pairs leading to a service area cabinet 33, commonly referred to as a SAC. The SAC 33 is coupled to distribution lines 15 each of which have 50 to 200 twisted pairs. Each distribution line 15 goes to a number of curbside boxes 17 located close to residential units 21 they are to serve. From each curbside box 17 there are from 4 to 10 drop lines 18 in which there are one to six twisted pairs leading to an associated network interface device called NID 19. From the NID 19 a number of inside lines 28 run to subscriber set top terminals 23. The inside lines 23 are usually twisted pairs but can also be coaxial cable. The length of line 11 may be several kilometers and so cross talk between the twisted pairs becomes of significant importance. It is necessary to install in the central office 10 a complex switch which switches the signal for a particular subscriber onto a given one of the several twisted pairs.

In the ADSL system of FIG. 1, signals are switched at the central office onto separate lines for each subscriber. The close proximity of the twisted pairs in feeder cable 11 over the long distances involved produces significant cross talk problems. Each pair in feeder line 11 on to which a signal has been placed is connected to a particular twisted pair in distribution line 15 and is taken off along one of twisted pair drop lines 18 to a network interface unit 19 corresponding to a residence 21. From unit 19 the signal is broadcast along inside lines 28 to each subscriber set top terminal 23.

Figure 2:
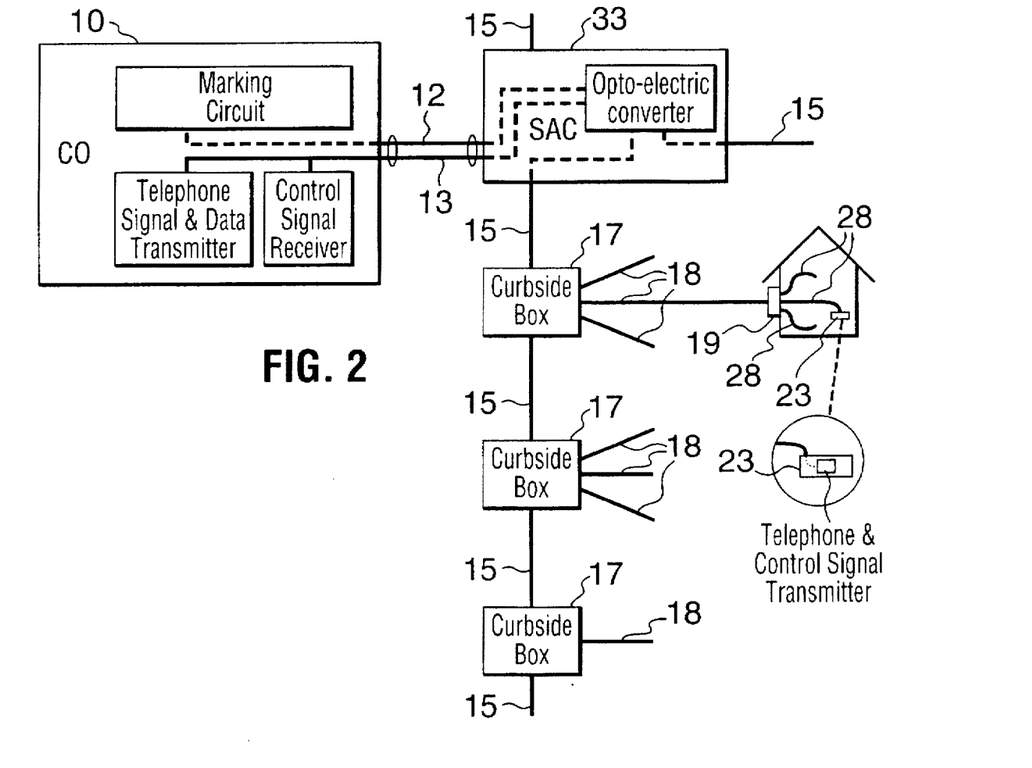
FIG. 2 is a schematic diagram of a broad band distribution system utilizing the infrastructure of FIG. 1.

Referring to FIG. 2 there is shown a schematic diagram of a broad band distribution system in which optical fibre lines 12 and 13 are installed between the central office 10 and the SAC 33. Line 12 is used for downstream light signals and line 13 for upstream light signals. The system of FIG. 2 is the same as that of FIG. 1 after the SAC 33. In the SAC 33 there are obviously optical to electrical and electrical to optical converters (not shown). However, the existing infrastructure of twisted pairs for the telephone network as shown in FIG. 1 is utilized.

Operationally, digital signals are sent along fibre line 12 to the box 33 where they are converted to electrical signals. The electrical signals are then broadcast along distribution lines 15 to a number of curbside boxes 17 located close to the subscriber residences 21 and go to each set top terminal 23. A given subscriber's set top terminal 23 examines each frame, determines which data in the frame belongs to that subscriber and then accepts that data. A particular subscriber is able to input information into the set top terminal 23 which instructs the central office 10 which information to send to that subscriber. The central office 10 formats each frame to identify the correspondence between subscribers and data. Alternately, the central office 10 could simply broadcast the signal so that it is able to be received by all set top terminals.

Figure 3:
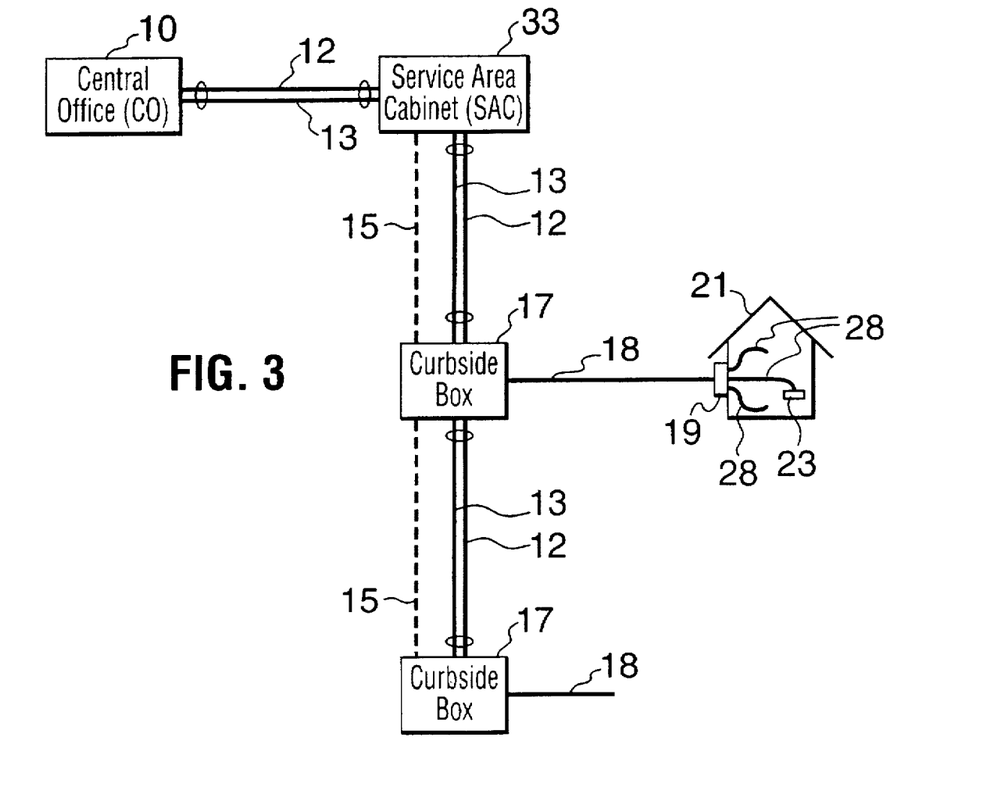
FIG. 3 is a schematic diagram of a broad band distribution system in which optical cable is installed up to the curbside boxes.

Referring to FIG. 3 there is shown a broad band distribution system in which fibers 12 and 13 are installed to each of the curbside boxes 17. In this case the optical to electrical and electrical to optical converters (not shown) are located in curbside boxes 17. The twisted pairs in distribution line 15 are used for conventional telephone service. They are shown in dotted form since they would not be present in any new service installations where optical distribution lines 12 and 13 are installed.

Figure 4:
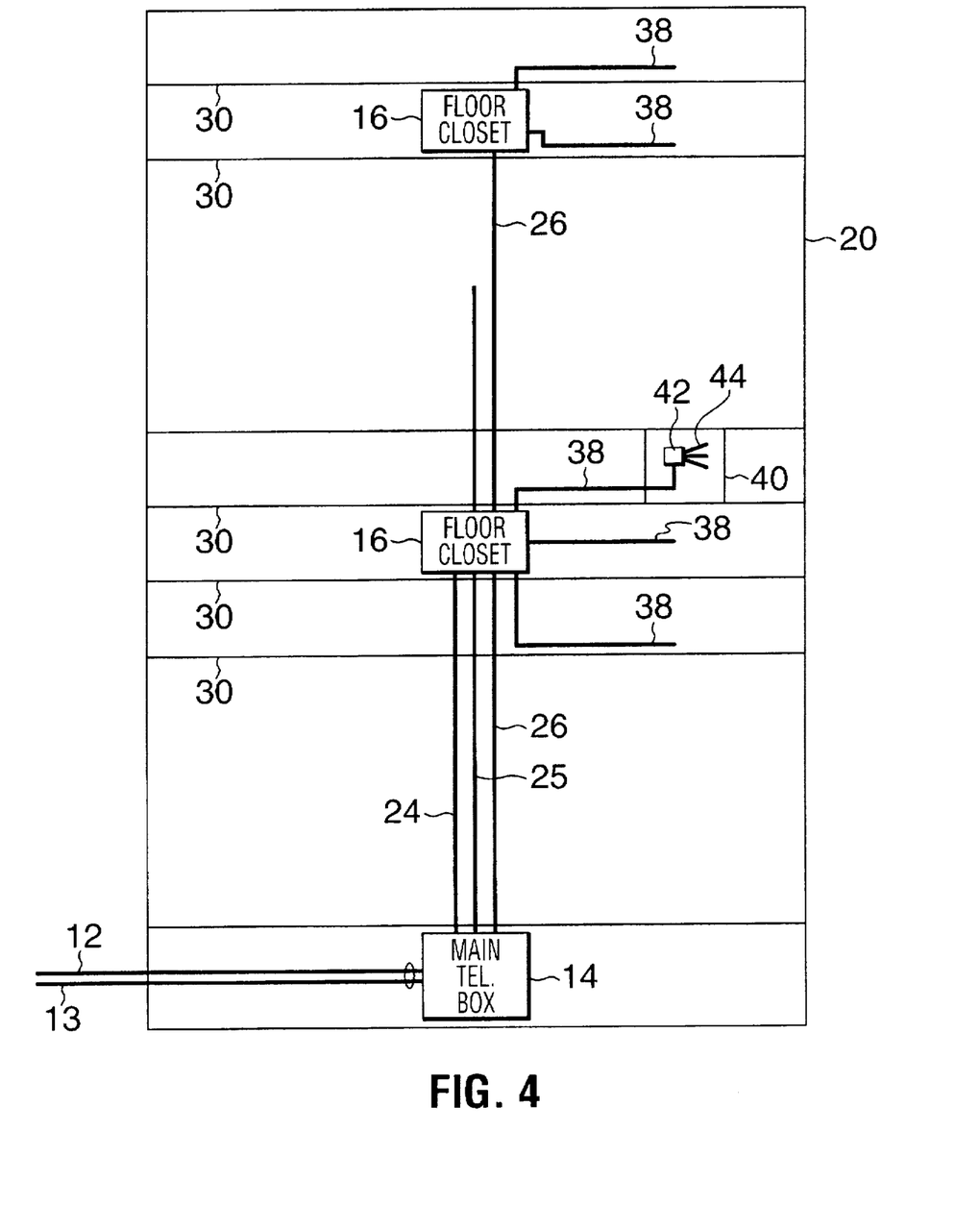
FIG. 4 is a schematic diagram of a broad band distribution system in which optical fiber is installed up to a building main telephone box.

FIG. 4 shows an installation of fibre optic lines 12 and 13 into a building 20. The lines 12 and 13 terminate in a main telephone box 14 located usually in the basement of the building 20. From main telephone box 14 a number of twisted pair lines 24, 25 and 26 run up to respective floor closet boxes 16. Each floor closet box 16 has lines 38 running to apartments 40 on each of two or three floors 30. Lines 38 run to a small box 42 located usually in the back of a closet in each apartment 40. From box 42 inside lines 44 run to respective set top terminals (not shown) in the apartment 40.

Figure 5:
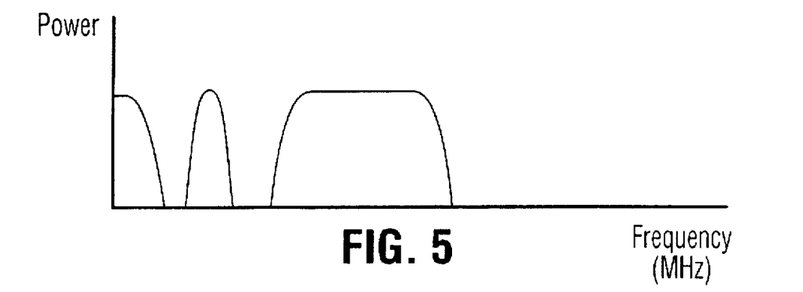
FIG. 5 is a power density versus frequency graph of a conventional ADSL-1 system.
Figure 6:
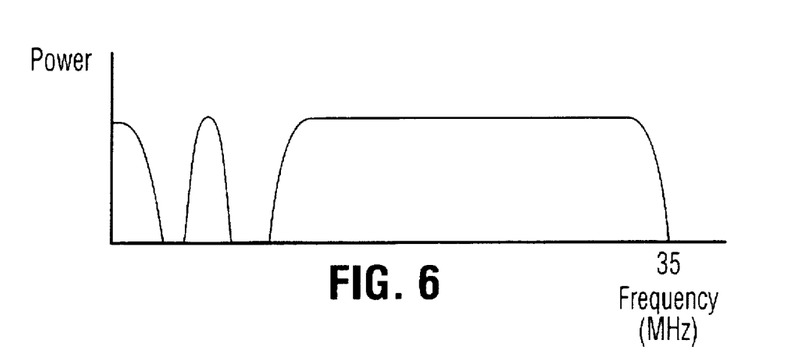
FIG. 6 is a power density versus frequency graph of the present system.

FIG. 5 shows the power density versus frequency for the conventional ADSL system showing the bandwidth of the downstream signals as having an upper 1 Megahertz limit. The plain ordinary telephone service (POTS) occupies the lower portion of the spectrum from DC up to an upper limit. The upstream portion corresponding to control signals sent by the subscriber up the lines to the central office occupies a small bandwidth above the POTS. Referring to FIG. 6 there is shown the power density versus frequency spectrum for the system in accordance with a preferred embodiment shown in FIGS. 2 to 4 in which the downstream bandwidth goes up to 35 Megahertz.

Figure 7:
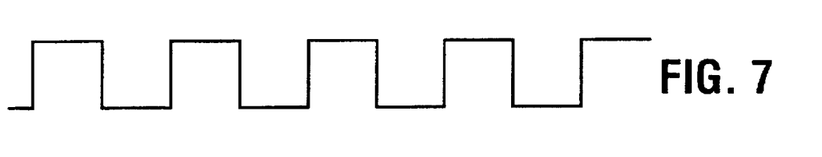
FIG. 7 is a wave form diagram showing a conventional digital pulse train.
Figure 8:
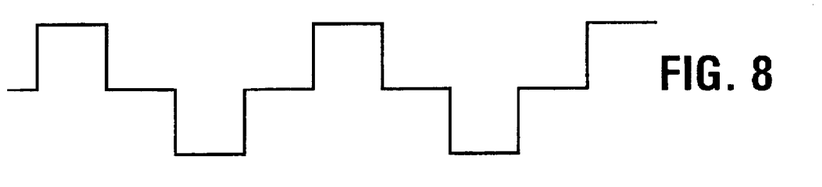
FIG. 8 is a wave form diagram showing an alternate mark inversion wave form.
Figure 9:
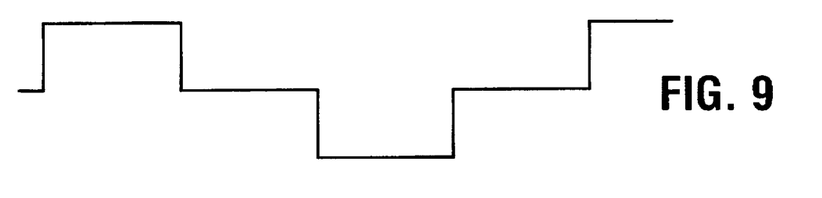
FIG. 9 is a wave form diagram showing an MLT-3 wave form.
Figure 10:
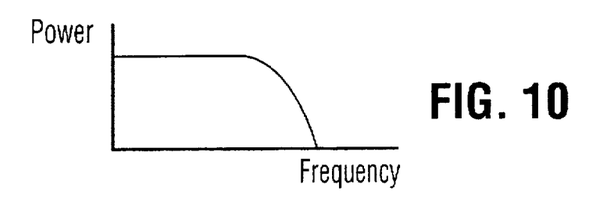
FIG. 10 is a power spectrum versus frequency graph for the wave forms of FIG. 7.
Figure 11:
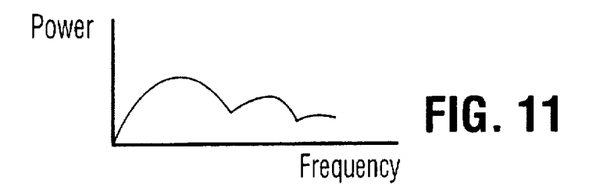
FIG. 11 is a power spectrum versus frequency graph for the wave forms of FIG. 8.
Figure 12:
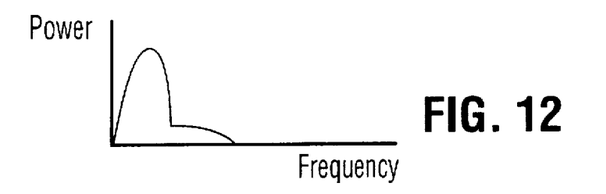
FIG. 12 is a power spectrum versus frequency graph for the wave forms of FIG. 9.

FIGS. 7, 8 and 9 show three coded wave forms that could be used as well as many others which are not shown. The sequence of 1's and 0's shown in FIG. 7 suffers the disadvantage that it carries a DC level as well as having a power density spectrum which goes down to DC. Thus, using this coding would not allow room for POTS or the upstream signals below it. Using the wave form of FIG. 8 which goes to zero before reaching DC allows POTS and upstream signals below it in frequency. The coding of FIG. 9 not only goes to zero at DC but is also weighted towards the lower frequencies and therefore would allow substantial increases of power without significant interference. The power density spectrums for these wave forms are shown in FIGS. 10, 11 and 12, respectively.

Figure 13:
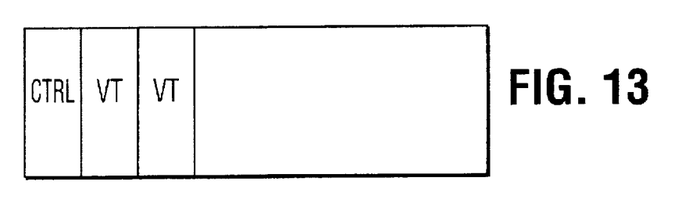
FIG. 13 is a SONET frame using virtual tributary mapping.
Figure 14:
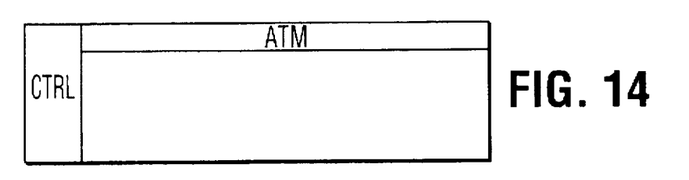
FIG. 14 is a SONET frame using a control column together with ATM cell mapping.
Figure 15:
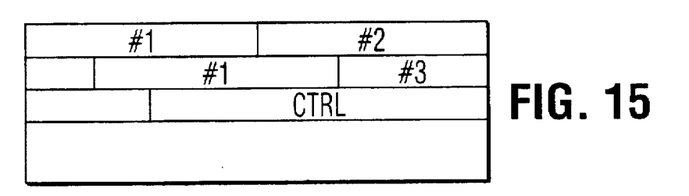
FIG. 15 is a SONET frame using ATM cell mapping including the control section.

Referring to FIGS. 13, 14 and 15 show the three different mapping formats that can be used. The first in FIG. 13 is a virtual tributary format in which a column of control signals is followed by a number of columns of data called virtual tributaries in which each tributary is dedicated to a particular subscriber set top terminal. In FIG. 14 ATM cell mapping is used in combination with a column of control signals. In FIG. 15 ATM cell mapping is used even for the control signals.

Accordingly, while this invention has been described with reference to illustrative embodiments, this description is not intended to be construed in a limiting sense. Various modifications of the illustrative embodiments, as well as other embodiments of the invention, will be apparent to persons skilled in the art upon reference to this description. It is therefore contemplated that the appended claims will cover any such modification or embodiments as fall within the true scope of the invention.

We claim:

1. A digital broad band transmission system for sending downstream broad band data and telephone signals from a central office to a number of subscriber set top terminals and to carry upstream control signals and telephone signals from each set top terminal to the central office, the digital broad band transmission system comprising:

(a) a marking circuit in the central office operative to mark each frame of data to indicate the set top terminals it is to be received by;

(b) a downstream and upstream optical fiber between the central office and a telephone distribution box proximate a plurality of said set top terminals, said downstream optical fiber coupled to said marking circuit;

(c) a telephone signal and data transmitter located in the central office and coupled to said downstream optical fiber and operative to transmit said frames of data and telephone signals along said downstream optical fiber to said telephone distribution box and for receiving upstream telephone and control light signals transmitted from said telephone distribution box along the upstream optical fiber to the central office;

(d) a control signal receiver in said central office coupled to the upstream optical fiber;

(e) an opto-electric converter located in said telephone distribution box and coupled to said downstream optical fiber so as to convert the light signals from said downstream optical fiber to electrical signals and coupled to said upstream optical fiber so as to convert electrical signals from the set top terminal to upstream light signals;

(f) a plurality of telephone drop lines coupled to said telephone distribution box at one end and coupled at another end thereof to respective ones of said plurality of set top terminals, each telephone drop line made up of one or more twisted pairs of conductors, said telephone drop lines operative to conduct said downstream electrical signals to said set top terminals;

(g) a telephone and control signal transmitter in said set top terminal operative to transmit telephone and control signals along said telephone drop lines to said to opto-electric converter for conversion to upstream telephone and control light signals;

wherein said downstream data is broadcast on ones of said twisted pairs in a single broad frequency band in a frequency range starting above a data frequency threshold of 1 megahertz, telephone signals are transmitted from the central office via said telephone distribution box to the set top terminals and from the set top terminals to the central office via said telephone distribution box in a distinct telephone signal frequency band below the data frequency threshold, and upstream control signals are transmitted from the set top terminals via said telephone distribution box to the central office, in a distinct control signal frequency band above said telephone signal frequency band, the control signal frequency band having an upper limit no greater than the data frequency threshold, and wherein the telephone signal and data transmitter and said telephone and control signal transmitter each output signals that are shaped so that a power versus frequency curve is weighted towards the lower frequencies and power drops to zero at zero frequency.

2. A system according to claim 1, wherein said set top terminals each have a control signal generator for generating control signals in response to subscriber input so as to control the data a subscriber receives.

3. A system according to claim 1, wherein the data, control and telephone signals each have an equal positive and negative going portions so that the average DC level of the signal is zero.

4. A system according to claim 1, wherein at least one of said telephone drop lines is a twisted pair coupled to a subscriber residence coaxial cable installation.

5. A system according to claim 1, wherein said frames are SONET.

6. A system according to claim 1, including a network interface device at each residence for terminating an associated drop line.

7. A system according to claim 1, wherein said single broad frequency band has an upper limit of about 35 megahertz.

8. A digital broad band transmission system for sending downstream broad band information in the form of frames of data and telephone signals from a central office to a number of subscriber set top terminals and to carry upstream control signals and telephone signals from each set top terminal to the central office, the digital broad band transmission system comprising:

(a) a marking circuit in said central office for marking each of said frames of data to indicate the set top terminals it is to be received by;

(b) a downstream and an upstream optical fiber between the central office and a service area box proximate a plurality of said set top terminals, said downstream optical fiber coupled to said marking circuit;

(c) a telephone signal and data transmitter in said central office for transmitting data and telephone signals along said downstream optical fiber to said service area box;

(d) an opto-electrical transceiver located in said service area box coupled to said upstream and downstream optical fibers for converting the light signals from said downstream optical fiber to electrical signals and for converting the electrical signals from said set top terminal to light signals for transmission along said upstream optical fiber;

(e) a distribution line coupled to said service area box at one end and to a plurality of curbside boxes located at spaced apart distances from one another;

(f) a plurality of telephone drop lines coupled to said curbside boxes at one end and coupled at another end thereof to respective ones of said set top terminals, each telephone drop line made up of one or more twisted pairs of conductors;

(g) means for transmitting said frames of data to said twisted pair conductors of said drop lines; and wherein said downstream data is broadcast on ones of said twisted pairs in a single broad frequency band in a frequency range starting above a data frequency threshold of about 1 megahertz and telephone signals are transmitted between the central office and the set top terminals in a distinct telephone signal frequency band (POTS) below the data frequency threshold, and upstream control signals are transmitted from the set top terminals to the central office, in a distinct control signal frequency band above said POTS frequency band, the control signal frequency band having an upper limit no greater than the data frequency threshold, and wherein the telephone signal and data transmitter and said telephone and control signal transmitter each output signals that are shaped so that the power versus frequency curve is weighted towards the lower frequencies and the power drops to zero at zero frequency.

9. A system according to claim 8, including a data transmitter located in each set top terminal operative to transmit data from each set top terminal to the central office along said telephone drop lines, said distribution line and said upstream optical fiber so that a subscriber may, control the data he receives.

10. A system according to claim 8, wherein at least one of said telephone drop lines is a twisted pair coupled to a subscriber residence coaxial cable installation.

11. A system according to claim 8, including a network interface device at each subscriber residence for terminating an associated telephone drop line.

12. A system according to claim 7, wherein said single broad frequency band has an upper limit of about 35 megahertz.

13. A system according to claim 7, wherein said broad band distribution line includes a second upstream optical fiber and a second downstream optical fiber.

14. A digital broad band transmission method for delivering from a central office downstream broad band data and telephone signals to a number of subscriber set top terminals and to carry upstream telephone and control signals from each set top terminal to the central office, said downstream broad band data signals including a plurality of frames of data, the method comprising the steps of:

(a) marking each frame of data to indicate the set top terminal or terminals it is to be received by;

(b) transmitting said frames of data and downstream telephone signals along an optical fiber to a service area box proximate a plurality of said subscriber set top terminals;

(c) converting the frames of data and downstream telephone signals from light signals to electrical signals;

(d) transmitting the electrical signals along a number of telephone drop lines wherein each telephone drop line is made up of at least one twisted pair of conductors and terminates at a subscriber location;

(e) transmitting upstream telephone signals and subscriber generated control signals from said set top terminals to said central office;

wherein the frames of data are transmitted on ones of said twisted pairs in a single broad frequency band above a data frequency threshold of 1 megahertz, the upstream and downstream telephone signals are transmitted in a second frequency band below said data frequency threshold, and the control signals are transmitted in a third frequency band below said data frequency threshold;

and wherein the downstream and upstream telephone signals, downstream broad band data signals and control signals are shaped so that a power versus frequency curve is weighted towards lower frequencies and power drops to zero at zero frequency.

15. A method according to claim 14, a control signal generator in each set top terminal operative to generate and transmit, in response to subscriber input, control signals to the central office so that a subscriber may control the data he receives.

16. A method according to claim 14, wherein the data, control and telephone signals each positive going portions and negative going portions with the area of the positive going portions equal to that of the negative going portions.

17. A method according to claim 14, wherein said single broad frequency band has an upper limit of about 35 megahertz.

18. A method of digital broad band transmission for use with a telephone system having a central office, a plurality of telephone curbside boxes and a number of set top terminals, said telephone curbside boxes coupled to said central office by at least one transmission line for upstream and downstream communication, each telephone curbside box coupled to at least one of said set top terminals by a telephone drop line having one or more twisted pairs of conductors, the method comprising the steps of:

(a) transmitting frames of data and downstream telephone signals from the central office to ones of said set top terminals via the transmission line, ones of the telephone curbside boxes and ones of the telephone drop lines;

(b) transmitting upstream telephone signals and control signals from the set top terminals along the telephone drop lines to the telephone curbside boxes, and from the telephone curbside boxes to the central office via the transmission line;

wherein the frames of data are transmitted on ones of said twisted pairs in a single broad frequency band above a data frequency threshold of about 1 megahertz, the upstream and downstream telephone signals are transmitted in a second frequency band below said data frequency threshold, and control signals are transmitted in a third frequency band below the data frequency threshold;

and wherein the upstream and downstream telephone signals, said frames of data and the control signals are shaped so that a power versus frequency curve is weighted towards lower frequencies and power drops to zero at zero frequency.

19. A method according to claim 18, wherein the telephone signals occupy a portion of the power versus frequency spectrum from DC up to an upper limit which is below the frequency of the control signal frequency band.

20. A method according to claim 18, including marking each frame of data in the central office with a destination address prior to transmission to said set top terminals.

21. A method according to claim 18, wherein said transmission line is a fiber optic cable having upstream and downstream fibers.

22. A method according to claim 18, including generating and transmitting control signals from the set top terminals to the central office in response to subscriber input so as to control the data a subscriber receives.

23. A method according to claim 18, wherein said single broad frequency band has an upper limit of about 35 megahertz.

24. A method according to claim 18, including generating equal positive and negative going portions for the data, control and telephone signals so that average DC level is zero.

25. A method according to claim 18, wherein said frames of data are SONET frames.

26. A digital broad band transmission system for sending downstream data and telephone signals from a central office to a number of subscriber set top terminals and to carry upstream control signals and telephone signals from each set top terminal to the central office, the digital broad band transmission system comprising:

(a) at least one broad band distribution line coupled to the central office;

(b) a telephone signal and data transmitter located in the central office operative to transmit said downstream data and telephone signals along said broad band distribution line;

(c) a plurality of telephone drop lines, each telephone drop line having a number of twisted pairs of conductors, each twisted pair of conductors coupled to one of said set top terminals;

(d) a telephone distribution box, coupled to said broad band distribution line and to said telephone drop lines, said telephone distribution box operative to:
  (i) receive downstream data and telephone signals from said central office;
  (ii) transmit downstream data and telephone signals received from the central office to said set top terminals;
  (iii) receive control signals and upstream telephone signals from said set top terminals via corresponding twisted pairs; and
  (iv) transmit control signals and upstream telephone signals received in (d) (iii) to said central office via said broad band distribution line;

(e) a telephone and control signal transmitter located in each set top terminal operative to transmit said control signals and upstream telephone signals from the set top terminals to said telephone distribution box for transmission to the central office;

wherein said downstream data signals are transmitted in a single broad frequency band above a data frequency threshold of about 1 megahertz, upstream and downstream telephone signals are transmitted in a second frequency band below the single broad frequency band and the control signals are transmitted in a third frequency band below the data frequency threshold;

and wherein the upstream and downstream telephone signals, control signals, and downstream data signals are shaped so that a power versus frequency curve is weighted towards lower frequencies and power drops to zero at zero frequency.

27. A system according to claim 26, wherein said downstream data signals are transmitted in frames of data and wherein the system includes:
  a marking circuit in the central office operative to mark each frame of data in the central office with a destination address to indicate the set top terminal it is to be received by.

28. A system according to claim 26, wherein the telephone signals occupy a portion of the power versus frequency spectrum from DC up to an upper limit which is below the frequency of the control signal frequency band.

29. A method according to claim 26, wherein said broad band distribution line includes an upstream optical fiber and a downstream optical fiber.

30. A system according to claim 26, wherein each set top terminal includes a control signal generator for generating and transmitting control signals from the set top terminals to the central office in response to subscriber input so as to control the data a subscriber receives.

31. A system according to claim 26, wherein said single broad frequency band has an upper limit of about 35 megahertz.

32. A system according to claim 26, wherein the data, control and telephone signals each have equal positive and negative going portions so that an average DC level for the signals is zero.

33. A system according to claim 26, wherein said downstream data signals are transmitted in SONET frames.

34. A system according to claim 26, wherein said broad band distribution line includes an upstream optical fiber and a downstream optical fiber and wherein said telephone distribution box includes means for converting the downstream data and telephone signals from the downstream optical fiber to electrical signals for transmission along the telephone drop lines and for converting the upstream telephone and control signals from the telephone drop lines to light signals for transmission along the upstream optical fiber.

35. A system according to claim 34, wherein at least one of said telephone drop lines includes a twisted pair coupled to a subscriber residence coaxial cable installation.

36. A system according to claim 34, wherein at least one of said telephone drop lines includes a fiber optic cable having an upstream and downstream fiber.

37. A system according to claim 34, including a network interface device at each residence for terminating an associated telephone drop line.

* * * * *